Patented Oct. 15, 1946

2,409,214

UNITED STATES PATENT OFFICE 2,409,214

INTAGLIO INK

Ernest D. Lee, West Englewood, N. J., assignor to Interchemical Corporation, New York, N. Y., a corporation of Ohio No Drawing. Application December 27, 1943, Serial No. 515,801

3 Claims. (Cl. 106—30)

This invention relates to intaglio printing inks, and aims to provide an improved vehicle for inks of this type, which dries rapidly, is far cheaper than similar vehicles heretofore available, is adapted for use in making colored inks, and has the unique advantage that it possesses practically no objectionable odor.

Since the introduction of the enclosed fountain in rotogravure printing presses, there has been an increasing demand for fast-drying intaglio inks. Suitable brown inks for the production of the well-known brown rotogravure sections of newspapers have been made by dissolving gilsonite in a solvent consisting of petroleum naphtha and a ketone as disclosed in W. W. Mock U. S. Patent No. 2,139,242. To obtain colored inks having equal drying speed, it was first suggested that nitrocellulose be used as a base though the cost of the resulting inks has been necessarily high. Consequently, attempts have been made continuously to use resins in place of the nitrocellulose in colored intaglio inks, but all of the inks thus produced which have the required printing and drying characteristics have been practically as expensive as the nitrocellulose inks.

To provide a colored intaglio ink having as low a cost as the gilsonite inks, the materials heretofore used as binders have been the relatively cheap domestic rosins and rosin derivatives and batu gum (a resin from the East Indies). The rosin and rosin derivatives have low viscosities and melting points, and when used alone do not produce inks having proper printing and drying characteristics. Batu gum is somewhat more expensive, is not always available, and requires the use of a mixture of petroleum naphtha and an oxygenated solvent such as methyl ethyl ketone to provide a satisfactory varnish.

I have discovered that certain resins obtained from Utah coals can be dissolved in low boiling substantially completely saturated aliphatic hydrocarbons which are relatively poor solvents for most materials, and that the resultant varnishes, when combined with coloring matter, make excellent intaglio printing inks by reason of the fact that the inks wet paper well, and by further reason of the fact that the resin rapidly loses solvent when exposed in a thin film, and thus permits rapid drying of the film to produce a dried print which compares favorably in hardness with the expensive nitrocellulose inks.

The resin which I use is of the type which is separated from Utah coals by froth flotation such as is described in the Green U. S. Patent No. 1,773,997. Such a resin, as obtained by the froth flotation technique, contains from 15 to 20% of finely divided coal, which is extremely difficult to separate from the resin. I have discovered that this difficulty is due to the presence in the resin of a small percentage (about 2 to 5%) of a resin which merely swells in hydrocarbon solvents, so that a solution prepared from the froth flotation concentrate will plug up a filter. According to the disclosures of my copending applications, Serial No. 515,803; Serial No. 515,804; and Serial No. 515,805, all filed on December 27, 1943, however, the desirable resin can be recovered from this froth flotation concentrate in any of several ways. For example, in accordance with the disclosure of my application, Serial No. 515,803, the flotation concentrate can be heated to an elevated temperature, advantageously on the order of 250 to 300° C., for a period, usually about 3 hours to 30 minutes, sufficient to render the entire resin content thereof soluble in hydrocarbon solvents such as petroleum naphtha and to produce freely filterable hydrocarbon solutions of the resin. The resulting heat-treated resin concentrate can then be dissolved in a hydrocarbon solvent, and the insoluble coal can be separated from the hydrocarbon solution by filtration.

Alternatively, as described in my application, Serial No. 515,804, the froth flotation concentrate can be treated with a solvent composed essentially of saturated hydrocarbons having six or less carbon atoms, hexane being especially suitable for this purpose. The resin content of the flotation concentrate is readily soluble in such a hydrocarbon solvent to form a freely filterable solution, and the insoluble coal can be separated by filtration. As disclosed in my application, Serial No. 515,805, the froth flotation concentrate can also be treated with diethyl ether, the resin content thereof being also readily soluble in such solvent to produce a freely filterable solution; and the insoluble coal can again be separated by filtration.

The resin containing the coal has a melting point (Fisher Johns method—see Eimer & Amend, Catalog 90, p. 619) of about 185° C. The heat-treated separated resin has a melting point of about 178° C.; the hexane or ethyl ether separated resin has a melting point of about 190 to 192° C. All the resins have a low acid number, an iodine number of the order of 100 or thereabouts, and a gravity just above 1.0; they are largely hydrocarbon in character, typical analyses of the coal free resin giving about 86.5 to 87% C, and about 11.1% H.

I find that in the production of black inks, the resin containing coal may be used, unless plate wear is a serious consideration; the hard siliceous matter in the coal tends to wear plates somewhat rapidly. Heat solubilized resin, with the coal separated, is the preferred resin for black inks. Where lighter colors are to be used, the portion of the resin which is soluble in hexane alone gives by far the best results.

The resins may be dissolved in practically any hydrocarbon solvents, in ketones, ethers and esters; they are insoluble in alcohols. They are miscible with nitrocellulose, and may be used in such inks to replace more expensive resins, as well as to make resinous inks.

Typical examples of my invention are the following:

*Example 1.—Red ink*

| | Parts by weight |
|---|---|
| Calcium lithol toner | 6 |
| Resin (separated from Utah coal by hexane) | 44 |
| Petroleum naphtha (heptane fraction) | 50 | are ground for 18 hours in a ball mill. An excellent red intaglio ink is obtained.

*Example 2.—Yellow ink*

| | Parts by weight |
|---|---|
| Chrome yellow | 35 |
| Resin of Example 1 | 25 |
| Heptane fraction | 40 | are made into an ink as in Example 1.

*Example 3.—Blue ink*

Similarly, a blue ink can be made by using—

| | Parts by weight |
|---|---|
| Milori blue | 15 |
| Resin | 35 |
| Petroleum naphtha (heptanes) | 50 |

*Example 4.—Black ink*

| | Parts by weight |
|---|---|
| Carbon black | 10 |
| Alkali blue | 0.5 |
| Fused coal resin—coal removed | 40.0 |
| Petroleum naphtha (heptanes) | 49.5 | are ground into an ink as in Example 1. The resin is much darker than the resin of Example 1, but gives a rapid drying ink.

If this resin is replaced by a resin containing coal, the ink is satisfactory, but exhibits plate wear.

Obviously, the examples can be modified without departing from the spirit of the invention, which is defined in the claims. In particular, other pigments and fillers can be used, and various modifying agents. Furthermore, aliphatic petroleum solvents of any desired volatility can be used to give the desired drying speed. The normal desired range includes those having volatilities roughly in the range from benzene to toluene.

I claim:

1. An intaglio printing ink comprising coloring matter dispersed in a vehicle which comprises a solution of Utah type coal resin in an aliphatic hydrocarbon solvent having a volatility in the range between that of benzene and that of toluene.

2. An intaglio printing ink comprising coloring matter dispersed in a vehicle which comprises a solution of coal resin free from coal in an aliphatic hydrocarbon solvent having a volatility in the range between that of benzene and that of toluene, said coal resin comprising the portion soluble in hexane and lower saturated hydrocarbons of the resin concentrate consisting of resin admixed with coal and obtained from a resin-bearing coal of the Utah type.

3. An intaglio printing ink comprising coloring matter dispersed in a vehicle which comprises a solution of coal resin free from coal in an aliphatic hydrocarbon solvent having a volatility in the range between that of benzene and that of toluene, said resin comprising the hydrocarbon soluble resin resulting from the heat treatment at a temperature on the order 250 to 300° C. of the resin concentrate consisting of resin admixed with coal and obtained from a resin-bearing coal of the Utah type.

ERNEST D. LEE.